(12) United States Patent
Marche

(10) Patent No.: US 7,655,583 B2
(45) Date of Patent: Feb. 2, 2010

(54) NON-WOVEN FABRIC LAMINATE/ELASTOMER/NON-WOVEN FABRIC

(75) Inventor: Thierry Marche, La Chappelle-Basse-Mer (FR)

(73) Assignee: Aplix, Paris (FR)

( * ) Notice: Subject to any disclaimer, the term of this patent is extended or adjusted under 35 U.S.C. 154(b) by 121 days.

(21) Appl. No.: 11/586,808

(22) Filed: Oct. 25, 2006

(65) Prior Publication Data

US 2007/0105472 A1 May 10, 2007

(30) Foreign Application Priority Data

Nov. 8, 2005 (FR) .................................. 05 11343

(51) Int. Cl.
*B32B 27/12* (2006.01)
(52) U.S. Cl. .................. 442/394; 428/113; 428/114; 428/167; 428/172; 428/195.1; 428/201; 442/328; 442/399
(58) Field of Classification Search ................. 428/113, 428/114, 195.1, 201, 167, 172; 442/328, 442/394, 399
See application file for complete search history.

(56) References Cited

U.S. PATENT DOCUMENTS

| 5,423,935 | A | * | 6/1995 | Benecke et al. | ............. 156/291 |
|---|---|---|---|---|---|
| 5,695,868 | A | | 12/1997 | McCormack | ............... 428/283 |
| 5,804,021 | A | * | 9/1998 | Abuto et al. | ................. 156/252 |
| 6,139,675 | A | | 10/2000 | Druecke et al. | ............. 156/277 |
| 2006/0148354 | A1 | * | 7/2006 | Shelley et al. | ............... 442/182 |
| 2006/0292328 | A1 | * | 12/2006 | Baldauf et al. | ................. 428/77 |

FOREIGN PATENT DOCUMENTS

| EP | 0 685 586 | 12/1995 |
|---|---|---|
| EP | 1 104 692 | 6/2001 |
| JP | 05245961 | 9/1993 |

OTHER PUBLICATIONS

International Search Report issued on Jul. 7, 2006 in French Application No. 05 11343.

* cited by examiner

*Primary Examiner*—Andrew T Piziali
*Assistant Examiner*—Peter Y Choi
(74) *Attorney, Agent, or Firm*—Renner, Kenner, Greive, Bobak, Taylor & Weber

(57) ABSTRACT

A laminate including at least one elastic film having a width and at least one layer of non-woven fabric fixed to the film on at least said width, through interposition of a fixing agent, in particular adhesive, whereby the at least one layer of non-woven fabric has an outer surface at a distance from the film. The outer surface (25) of the at least one layer of non-woven fabric is corrugated in the stretched state of the laminate, having ridge zones (22) and hollow zones (23), whereby fixing agent (20) is provided between the ridge zones and the elastic film.

20 Claims, 3 Drawing Sheets

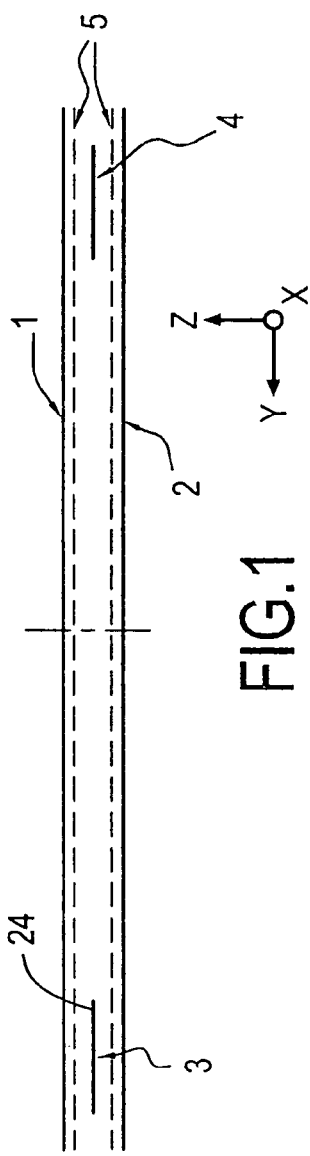
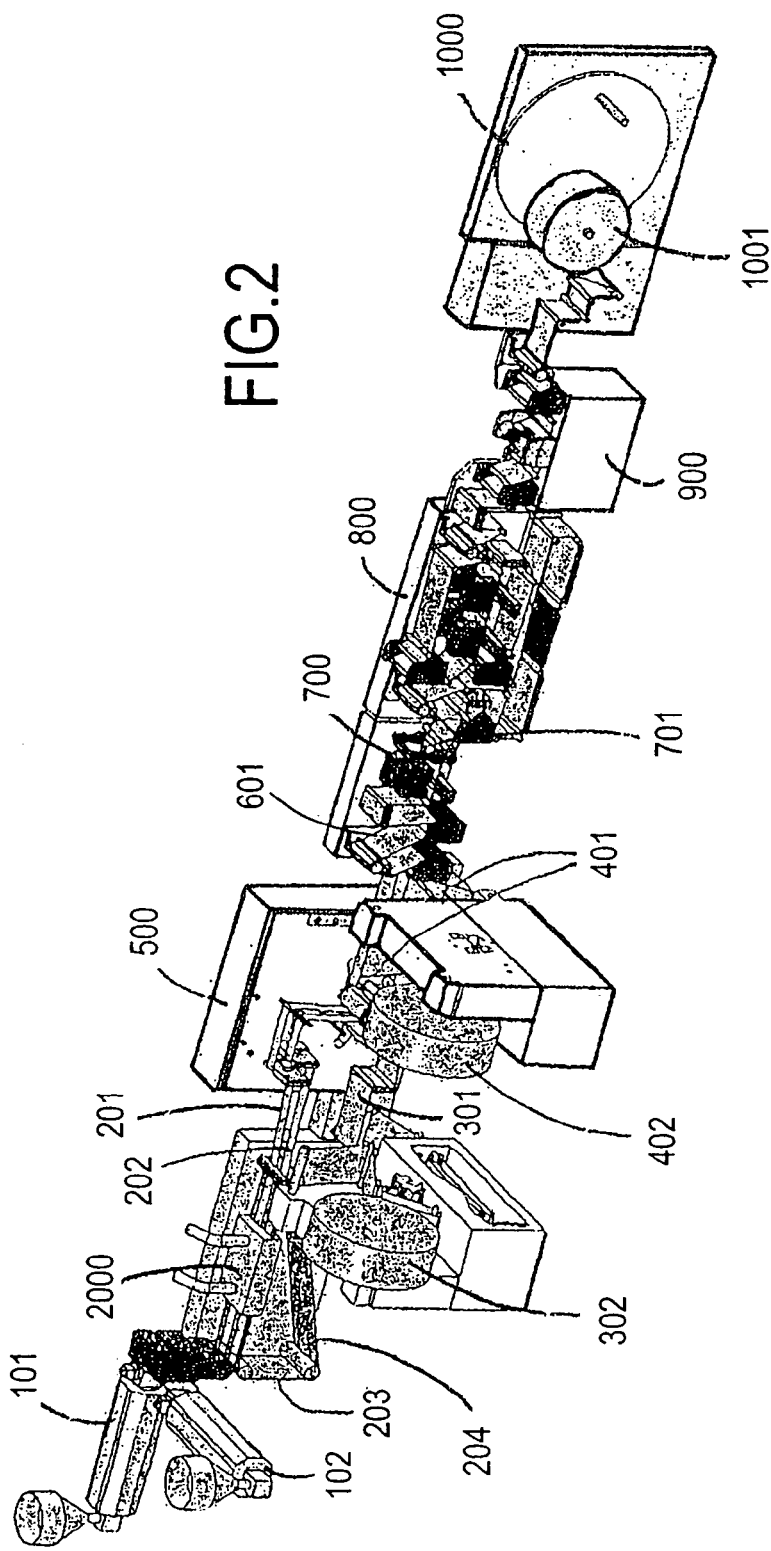

NON-WOVEN FABRIC LAMINATE/ELASTOMER/NON-WOVEN FABRIC

TECHNICAL FIELD

The present invention relates to a laminate comprising at least one elastic film, particularly with an elastomer base, particularly thermoplastic, and at least one layer of non-woven fabric. These laminates are used in particular in applications in the field of clothing, particularly disposable, such as training pants or adult incontinence devices or in the medical field in the form of elastic bandages. In the field of training pants, these laminates are conventionally used in the sections forming the waistband around the waist of the baby. In the case of a particularly advantageous application to training pants, these laminates are used to realize the elastic flaps ensuring that the nappy is kept on the baby and supporting, amongst other things, a self-gripping element.

BACKGROUND ART

It is desirable for this laminate to be elastic in the transverse direction (that is to say in the direction extending from one flap to the other) at least, in order to allow good holding of the training pants around the waist of the baby. The current laminates are generally constituted by a film made of elastic or elastomer material which is generally sandwiched between two layers of non-woven fabric. In order to allow large-scale production of training pants, it is currently necessary to unwind this elastomer film from a reel to bring it between the two layers of non-woven fabric in order to fix them mutually, for example through lamination, for example through an adhesive. However, this method has the drawback that it is necessary to provide in the construction of the film at least one outer layer, preferably two, forming skins, which are made of a relatively inelastic material and have, amongst other things, non-adhesive or non-bonding properties which thus allows the elastomer film to be wound on itself on reels so as to unwind it easily during the production of the laminates constituted by this elastomer film and the two non-woven fabrics. The laminates known today are thus constituted by an elastic film, having at least one outer layer of a substantially inelastic material, and a sheet or layer of non-woven fabric fixed to said at least one outer layer.

This type of laminate of the prior art is complex to produce by reason of the presence of the layer(s) forming the skin(s) and also by reason of the fact that since the skin(s) is/are chosen, with regard to their material, so that they have sufficiently low bonding qualities in order to allow winding of the film, surrounded by the skins, on a reel and then easy unwinding thereof; During the fabrication of the laminate, it is necessary, in order to then stick this skin to the outer non-woven fabrics, to use so-called technical adhesives, in particular with a high tackifying power and/or with high grammage, for example greater than 12 gsm. Generally, it is necessary to carry out surface treatment such as Corona treatment or plasma torch treatment.

After formation of the laminate it is then necessary to provide for a particular mechanical treatment called "activation", in order to allow the entire laminate constituted by the elastomer film, the skins and the non-woven fabrics to have sufficient elasticity, such as required in order to be able to adjust the waistband of the training pants around the waist of a baby and to do this in spite of the relatively inelastic character of the materials chosen for the skin and the non-woven fabrics. This activation process consists in stretching the laminate transversely in the machine direction, by stretching the skin(s) and the non woven(s) beyond the elastic limit. After the stretching, the elastic film and the laminate as a whole resume a width which is greater than or equal to that before stretching, but the skins and the non woven(s) have been stretched in an irremediable manner in such a way that the laminate as a whole now has transversal elasticity, and can be stretched at least as far as the width to which the skins and the non woven(s) have been stretched irreversibly.

Laminates are also known from the prior art which are formed through direct extrusion of the elastic film on the non-woven fabric whereby the fixing is realized through hardening of the elastic material on the fibres of the non-woven fabrics. In this case also, it is necessary to realize an "activation" which does not lend itself well to non-woven fabrics which, after activation, exhibit a rough touch which tends to irritate the skin of the wearer of the training pants, particularly babies. Besides, this direct extrusion is difficult to implement and in particular the extruded elastic film in the form of a hot viscous material tends to impair the non-woven fabric to the point that fibres of the non-woven fabric fuse, rendering the surface of the non-woven fabric rigid, and are submerged in the elastic film.

DISCLOSURE OF THE INVENTION

It is an object of the present invention to overcome the drawbacks of the prior art by aiming to obtain a laminate comprising at least one film of elastic or elastomer material and at least one layer of non-woven fabric, preferably two layers of non-woven fabric on either side of the film which can be manufactured as rapidly as with the present methods while rendering unnecessary the presence of skins in order to allow unwinding from a reel in the production process, and of which the non-woven fabrics, after activation, exhibit a excellent touch, and in particular is soft to touch and does not cause irritation to the skin of the wearer of the nappy, particularly a baby.

According to the invention, the laminate is manufactured by preparing the elastic film by extruding it from an extrusion die in order to obtain, after cooling, a substantially solid film, laminating the substantially solid film on a layer of non-woven fabric and interposing a fixing agent, then stretching the laminate transversely in order to break the fibres of the non-woven fabric(s) and/or the cohesion between them.

Thus, it is no longer necessary on the one hand to unwind the film from a reel and thus to provide protection skins, and on the other hand without having to extrude the film directly on the non-woven fabric, in such a way that the non-woven fabric is not impaired. As the skins are no longer necessary, the elastic film is consequently thinner.

Preferably, the laminate, after activation of the non-woven fabric(s), has a remanence of less than 15%, preferably less than 10%, more preferably less than 5% for stretching of 100% of the initial width.

Preferably, the fixing agent, particularly adhesive, is applied through transverse bands which are separated from each other, in particular being substantially jointive.

Therefore, during the transverse stretching, the fibres of non-woven fabrics have a tendency to agglutinate on the bands of adhesives after having been broken away from each other through stretching, in such a way that the non-woven fabric, in the stretched state of the laminate, has first zones of a first thickness equal to or greater than the initial thickness of the non-woven fabric (before stretching of the laminate) and second zones of a second thickness which is smaller than the initial thickness of the non-woven fabric.

The present invention also relates to a laminate comprising at least one elastic film having a width and at least one layer of non-woven fabric fixed to the film at least on said width through direct interposition of a fixing agent, in particular adhesive, whereby the at least one layer of non-woven fabric has an outer surface at a distance from the film, characterized in that the outer surface of the at least one layer of non-woven fabric is, in the stretched state of the laminate, corrugated, comprising ridge zones and hollow zones, whereby fixing agent is provided between the ridge zones and the elastic film.

According to a preferred embodiment of the invention, the hollow zones are substantially without non-woven fabric in the stretched state.

The laminate as a whole now has a very soft touch, both in the stretched and non-stretched states. Besides, the laminate is more pleasant to use, the possibility of elongation being more significant, and in particular less restricted, or not restricted, by the non-woven fabric or the skin, in such a way that the user has more elasticity "reserve". Thus, for example when fastening a waistband of training pants, the latter can be arranged in the best way possible around the waist of the baby, whereby this is more pleasant for the baby. Finally, the non-woven fabric lends itself better to breaking and is soft to touch and in particular does not irritate the skin. According to the invention, "whereby fixing agent is provided between the ridge zones and the film" means that if a line is traced perpendicularly to the surface of the film, this extends from the film to a ridge of the non-woven fabric, passing via fixing agent.

According to the present invention, there is no more any deformable inelastic skins, nor any varnish, between said fixing agent or adhesive and the elastic film, and this on one hand simplifies the fabrication of the laminate, and on the other hand allows the obtention of a laminate which has particularly good elasticity and is pleasant to wear and to use.

According to a preferred embodiment, the fixing agent, in particular adhesive, is applied on the one hand in the form of first bands separated from each other, preferably being parallel, and having a first grammage, and on the other hand in the form of second bands placed between the first bands, the second bands having a second grammage which is lower than the first grammage, whereby the second grammage is preferably less than 50% of the first grammage, in such a way that after transverse stretching the non-woven fabric is broken and the fibres of the non-woven fabric accumulate on top of the first bands, whereas for the second bands, in the stretched state of the laminate, the fibres of non-woven fabrics are in a smaller quantity.

According to a further preferred embodiment, the fixing agent is applied in the form of bands which are separated from each other by intermediate zones without fixing agent or without adhesive, whereby the bands are in particular jointive, in such a way that the ridge zones are on the bands of fixing agent whereas the hollow zones are on the intermediate zones.

According to a development of the invention, after activation, the laminate has a remanence of less than 15%, preferably less than 10%, more preferably less than 5%, after an elongation of 100% of the initial width.

According to a preferred embodiment, the outer surface of the at least one layer is substantially planar in the non-stretched state of the laminate.

According to a preferred embodiment, the ridge zone(s) is/are of a constant thickness.

According to a preferred embodiment, the hollow zone(s) is/are of a constant thickness, particularly zero.

According to a development of the invention, the elastic film is homogeneous, at least in the direction of its thickness. This means that at any point on the surface of the film, the film over its whole thickness at this given point has the same formulation, with identical properties.

According to a further development of the invention, the elastic film has multiple layers of elastic materials.

According to a development of the invention, the thickness of the elastic film is variable in the stretching direction of the laminate (transverse direction), particularly with a view to obtaining a regularly spreaded elongation in the particular case of a flap which is cut off following a given form or with a view to managing the elasticity of the laminate zone by zone.

According to a preferred embodiment of the invention, the at least one elastic film has, on the side of the at least one layer, a surface which in longitudinal section, that is to say perpendicularly to the direction of said width, is in the form of a line, in particular straight, whereby all the fibres of the at least one sheet of non-woven fabric are on the side of the line opposing the elastic film.

The present invention also relates to training pants comprising a laminate according to the invention, particularly in the waistband which is to surround the waist of the baby.

Preferably, the fixing agent interposed between each layer of non-woven fabric and the film is an adhesive, preferably of a chemical nature similar to the material of the elastomer film, particularly with a base of SIS, SBS, SEBS, SIBS or SEPS, facilitating adhesion to the elastic film. According to a further possible embodiment the adhesive is a reactive adhesive such as a cross-linkable PU, allowing better temperature-resistant characteristics to be obtained (yield).

BRIEF DESCRIPTION OF THE DRAWINGS

By way of example, embodiments of the invention will now be described by reference to the drawings, in which:

FIG. 1 is a sectional view of a laminate according to the invention, transversely to the machine direction or unwinding direction thereof, FIG. 2 is a perspective view of a production installation for a laminate according to the invention.

PREFERRED EMBODIMENT FOR CARRYING OUT THE INVENTION

Figure 3:
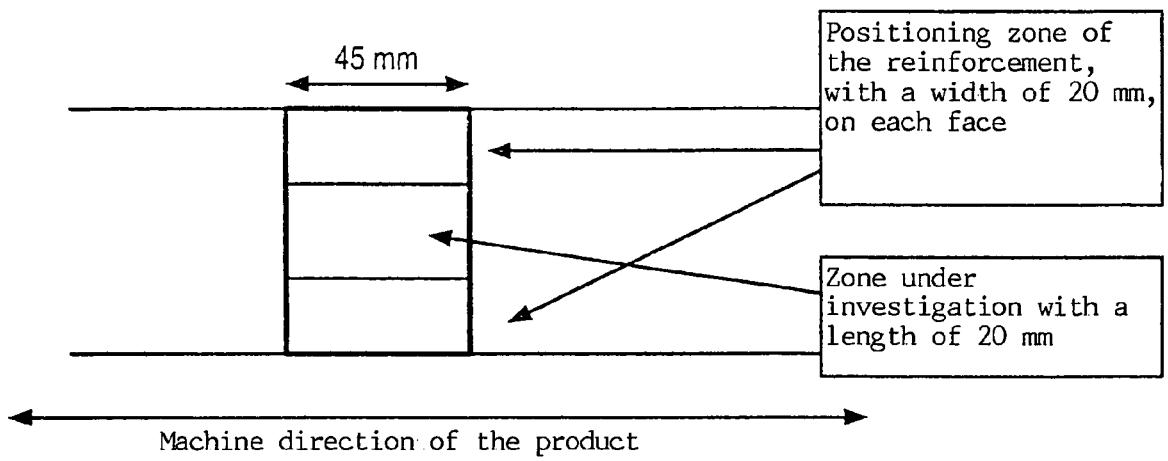
FIG. 3 is a diagram showing a sample of elastomer or elastic material prepared for realization of the hysteresis test, allowing the determination of the SET of an elastic material.
Figure 4:
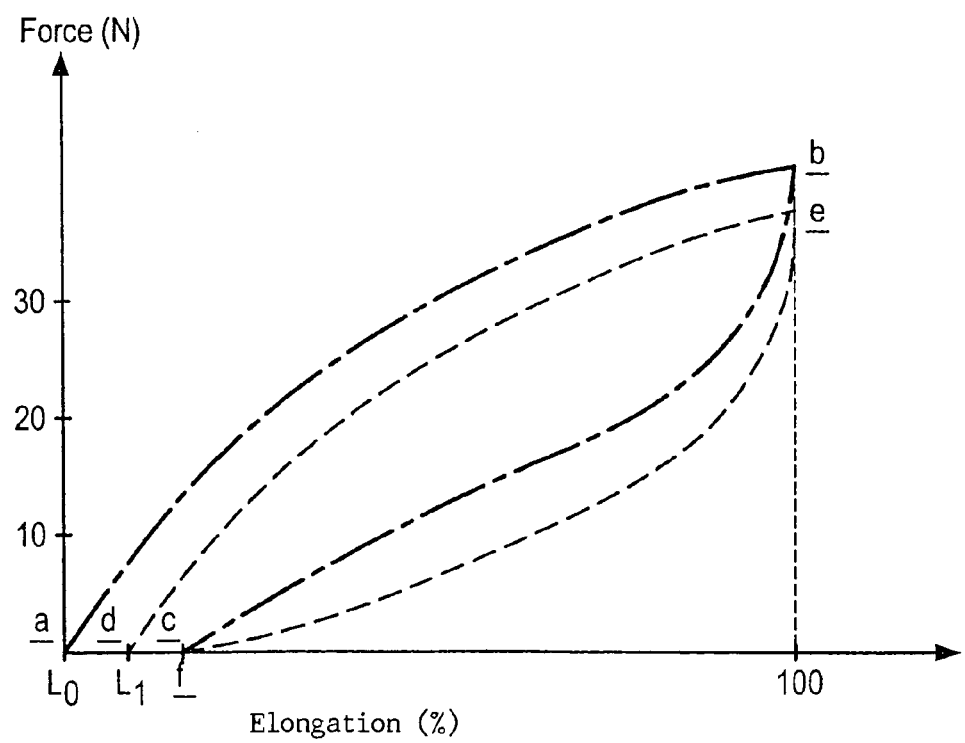
FIG. 4 shows the form of the hysteresis curve obtained when realizing the test, allowing the determination of the SET through calculation.

FIG. 1 shows, according to a sectional view transversely to the machine direction (direction of the X), that is to say the direction of the Y in which the laminate extends according to the invention. This laminate is constituted by two sheets or layers of non-woven fabric 1 and 2 having a large width, for example a width of 350 mm here. Two elastomer films 3, 4 of a small width, for example 35 to 40 mm, are sandwiched between the two sheets of non-woven fabric. Two layers of adhesive 5 fix each non-woven fabric to one of the faces of the elastomer films and, when there is no elastomer film, in the central region, to the other non-woven fabric.

The layers of adhesive are in the form of bands which are parallel to each other, at a distance from each other, whereby this distance can be zero and between 0 mm and 2 mm for example.

After formation of the laminate, the two layers of non-woven fabric, on the at least one elastomer film, are activated through passage between activation rollers, that is to say that these two non-woven fabrics in the section covering the at least one elastomer film are broken preferentially in cross direction (or transverse direction) in order to form sorts of grooves in the transverse direction so that, at the level of the two elastomers, the laminate has an elasticity in the transverse direction corresponding substantially to those of the elastomer films.

In order to realize this break, the laminate is passed, holding it in its central section where it is sought to form grooves, through application of an elastic band which plates the laminate by covering it, and the laminate and the elastic band which is in contact therewith are subsequently stretched, deforming them in order to break the fibres of the non-woven fabric of the laminate away from each other, thus breaking the non-woven fabric, whereby the elastic film and the elastic band are stretched merely elastically during this stretching through deformation. Once the deformation is complete, the elastic film and the elastic band are restored to their non-deformed, initial position whereas the non-woven fabric is broken permanently.

After the breaking-away (de-cohesion of the fibres with respect to each other) the fibres of the non-woven fabrics have a tendency to regroup on the bands of adhesive in order to form monticules of non-woven fabrics whereas between the bands of adhesive the fibres of non-woven fabrics, by reason of the break, are more rare and are more sparse, possibly even no longer present. There are thus ridge zones 22 (on the bands of adhesive) where the non-woven fabric has a greater thickness than in the intermediate zones (where there is no adhesive) or hollow zones 23 where possibly, in the extreme case, there can no longer be any non-woven fabric. In the non-stretched state of the laminate the zones of the greatest thickness come into lateral contact (through their edge parallel to the transverse direction) with respect to each other and when the laminate is stretched the zones of greatest thickness distance themselves from each other, whereby the intermediate zones thus appear either without non-woven fabric or with a smaller thickness of non-woven fabric. Thus, in the non-stretched state, with the exception of discrete lines at the breaks or fractures, the outer surface 25 of the layer of non-woven fabric is substantially planar with the exception of the discrete lines 23 corresponding to the breaks realized in the zones without adhesive.

Figure 5:
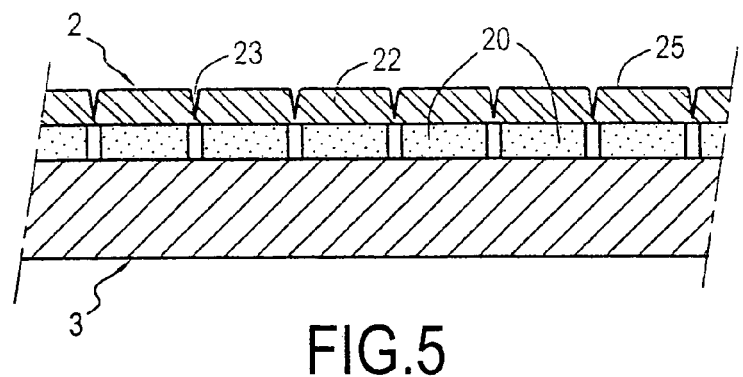
FIG. 5 shows a laminate according to the invention, after breaking, in the non-stretched state.
Figure 6:
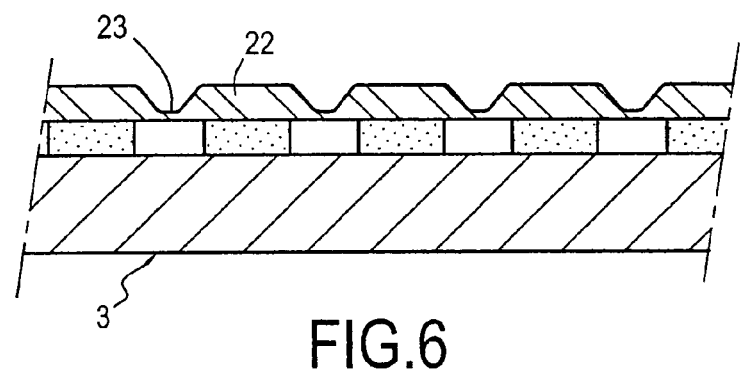
FIG. 6 shows the laminate of FIG. 5 in a stretched state.

In FIG. 5, bands 20 of adhesive can thus be seen at a distance from each other and the non-woven fabric 2 comprises ridge zones 22 with a greater thickness (with respect to the thickness of the non-woven fabric before breaking) and hollow zones 23 of a smaller thickness (with respect to the thickness of the non-woven fabric before breaking) which can be seen better when the laminate is stretched (FIG. 6).

The elastic film has a width I perpendicularly to the direction of application on the sheet of non-woven fabric. It has a surface, on the side of the non-woven fabric 2, of a planar form. In longitudinal cross-section this surface has the form of a straight line 24. No fibre of the non-woven fabric is submerged in the material of the elastic film and all the fibres are on the same side of the straight line 24 and this is irrespective of the longitudinal cross-section. In the non-stretched state the non-woven fabric also has an inner surface (on the side of the film) which is substantially planar.

In the non stretched state, the upper outer edges 27, 28 of the ridge parts mutually separated by the hollow parts in the stretched state come essentially in contact the ones with the others, so that the impression given to the user is that the upper surface of the non woven fabric, consisting of the assembly of the ridge zones and of the hollow zones, is substantially flat and smooth.

Figure 7:
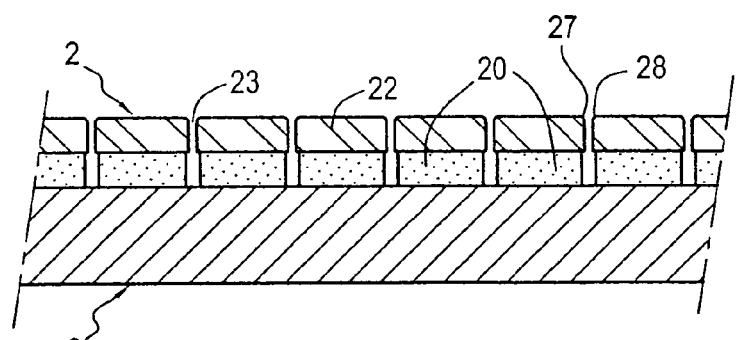
FIG. 7 shows another embodiment of a laminate according to the invention, after breaking, in the non stretched state.
Figure 8:
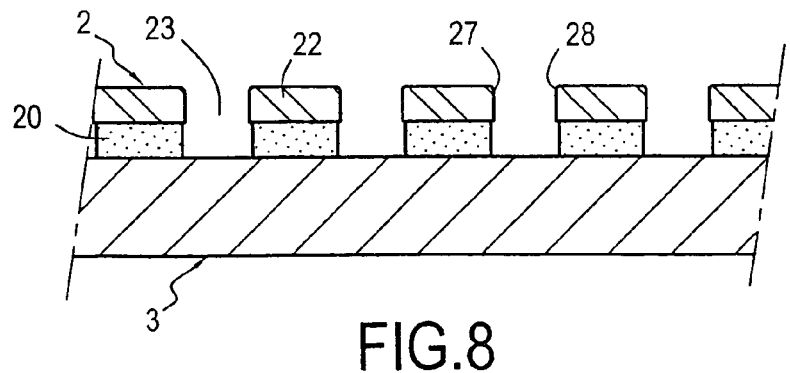
FIG. 8 shows the laminate of FIG. 7 in a stretched state.

In FIGS. 7 and 8, it is shown an embodiment in which in said hollow parts there is essentially no more fibers of non woven, the whole of the non woven having agglutinated itself on top of the adhesive part to form the ridge parts. In the stretched state, the ridge parts consists of non woven fibers and adhesive, and are mutually separated by hollow parts essentially without non woven and without adhesive. In the non stretched state, the ridge parts come essentially in lateral contact the ones with the others to give the user the impression of an upper surface which is substantially flat and smooth. The parts shown in FIGS. 7 and 8 which are equivalent to parts of the embodiment of FIGS. 5 and 6 have the same numerical references.

It is elasticity in the transverse direction which is sought in particular.

The fact that the two elastomer films have a small width with respect to a large width of the non-woven fabrics has been described here. It would also be possible, however, to provide a single elastomer film of the same length as the two sheets of non-woven fabric or more than two elastomer films of which the cumulative widths are less than or equal to that of the non-woven fabric.

The thickness (measured in the direction of the Z) of the elastomer film is constant here along the direction of the Y (cross direction or transverse direction). However, a thickness could also be provided which varies in this transverse direction.

The elastic material may or may not have thermo-retractable characteristics. It can be formed in particular from polymers such as copolymers of different types of design of monomers, for example alternating such as A-B, or in sequence, for example A-A-A-B-B-B, or statistical, for example A-A-B-A-B-B-A-A-A-B-A, whereby the whole of the network obtained can have different structures, either linear of the type A-B-A or radial of the type (A-B)n, index n (n>2), or diblock of the type A-B, which are elastomers, for example styrene/isoprene (SI), styrene/isoprene/styrene (SIS), styrene/butadiene/styrene (SBS), styrene-ethylene/butylene-styrene (SEBS), styrene-ethylene/propylene-styrene (SEPS) or SIBS copolymers. Mixtures of these elastomers with each other or with non-elastomers modifying certain characteristics other than elasticity can also be taken into consideration. For example up to 50% by weight but preferably less than 30% by weight of polymer can be added in order to modify certain characteristics of the base materials (elasticity, heat resistance, processability, UV resistance colouring agent, etc.) such as styrene polyvinyls, polystyrenes or poly α-methyl-styrene, epoxy polyesters, polyolefines, for example polyethylenes or certain ethylene/vinyl acetates, preferably those of a high molecular weight.

The elastic material can be, in particular, a styrene-isoprene-styrene, available for example from Kraton Polymers under the denomination KRATON D (trade mark filed) or DEXCO POLYMERS LP under the denomination VECTOR SBC 4211 (trade mark filed) A thermoplastic elastomer of polyurethane, particularly PELLATHANE (trade mark filed) 2102-75A of The Dow Chemical Company can also be used. A styrene-butadiene-styrene can also be used, in particular KRATON D-2122 (trade mark filed) of Kraton Polymers, or VECTOR SBC 4461 (trade mark filed) of Dexco Polymers LP. A styrene-ethylene-butylene, in particular KRATON G-2832 (trade mark filed) of Kraton Polymers can also be used, or a styrene-ethylene-butylene-styrene (SEBS) sequenced copolymer can also be used, in particular KRATON (trade mark filed) G2703. A copolymer of isooctyl acrylate and acrylic acid can also be used in accordance with the monomer ratios of 90/10. A polyether polyamide sequenced copolymer PEBAX (trade mark filed) 2533 can also be used, of Arkema.

Other possible materials are polyolefine polymers, in particular ethylene and/or propylene copolymers, having characteristics of elastomers, in particular deriving from metallocenic catalysis, such as VISTAMAXX VM-1120 (trade mark filed), available from Exxon Mobil Chemical or EPDM charged polymers of the Santoprene type.

According to the invention it is possible to use an adhesive such as non-reactive hot melt adhesives, for example H2511 of Bostick, or a reactive PU adhesive, in particular AX75E of Bostick. Preferably, these adhesives will have a chemical nature similar to the elastomer film described above. For example if one of these adhesives is analysed with an infrared spectrometer in order to identify the chemical functions, or a liquid chromatograph in order to separate and quantify the substances, traces of one or more components or their derivatives of the material or the materials of the elastomer film will preferably be found.

Preferably, these adhesives have a SIS, SBS, SEBS and SEPS base and allow good affinity with the film by similar chemical materials.

Preferably, the layer of adhesive has a lower grammage than 15 g/m2, particularly lower than 12 g/m2, more preferably lower than 8 g/m2.

In place of adhesive as a fixing agent, bands can be provided, on which a solder with ultrasound or fusion is realized. The melted intermediate material thus acts as a fixing agent within the meaning of the invention.

With regard to the non-woven fabrics, polypropylene, polyester and any other materials which are customary in the field can be used. It is also possible to play on the elongation on transverse rupture of the non-woven fabrics in order to allow the activation to the maximum.

According to another possible embodiment of the present invention, the non woven fabric can be such as to have an high extensibility in one direction. To obtain such a non woven, one disposes staple non woven fibers all substantially in a same machine direction and one bond them together either by point bonding which are at a distance the ones from the others, or by hydro entangling. The non woven fabric has then the ability to be extended in one direction. When it is fixed with adhesive bands to an elastic film, one obtains a laminate having an elasticity between its rest state in which the fibers are all sustantially oriented in the same direction and an extended state, in which the fibers do not extend themselves all in the initial direction. An extensibility of 200% in one direction is preferable.

A first possible non woven fabric is a spunlace non woven 100% in Polypropylene fibers or in a mix of Polypropylene and Polyethylene, of a basis weight comprised between 25 and 30 g/m², the non woven fibers being bonded together by hydro entangling. The fibers are neatly oriented in the machine direction, so that the non woven fabric is resistant in this machine direction and extensible in the cross direction. Such a non woven fabric is available from the Sandler company, under the reference Sawatex (registered trademarks) 2628.

Another possible non woven is a carded non woven fabric 100% in Polypropylene fibers of a basis weight comprised between 22 and 27 g/m². The fibers are bonded together by bonding points (fusion) of small dimensions and at a distance the ones from the others. The fibers are neatly oriented in the machine direction so that the non woven fabric is resistant in this machine direction and extensible in the cross direction. Such a non woven fabric is available from the BBA Fiberweb Company, under the reference FPN 571D.

FIG. 2 shows a production installation for a laminate according to the invention. The installation comprises two extruders 101, 102 which form, through extrusion, two narrow webs 201, 202 of elastomer films which, after cooling in an intermediate cooling unit 2000, through systems with belts 203 and rollers 204 with temperature regulation, are transported towards two rollers which simultaneously receive two layers of non-woven fabric 301 and 401 in order to be fixed there through adhesion of the elastomer material between the non-woven fabrics in a fixing unit 500. The non-woven fabric 301 is unwound from a reel 302. The second non-woven fabric 401 is unwound from a reel 402. The complex unit constituted by the non-woven fabrics 301 and 401 and the elastic films 201, 202, namely the complex unit 601, is then cut to the correct width in a cutting system 700 comprising circular knives 701, then passes into a soldering unit 800, allowing soldering of the longitudinal edges. In case of use non wovens that have to be activated, this can be done for example in an activation unit 900, in which the laminate is stretched transversely to the machine direction in such a way that the bands of adhesive tend to move away from each other with the zones of non-woven fabrics on top of them whereas the fibres on top of the zones between two bands of adhesive tend to break in order to facilitate the moving-apart of the bands. A laminate is finally obtained which has two types of zone, very elastic zones (between the bands of adhesive) having few fibres of non-woven fabric, and zones with limited elasticity (on top of the bands of adhesive) having a lot of non-woven fabric. The activation can also be realized as described in the American patent U.S. Pat. No. 4,834,741, using toothed rollers, whereby the laminate passes between the teeth of two opposing rollers, and the two teeth engage in each other in order to realise the stretching. It should be noted that in this case, however, it is not the teeth which are at the origin of the elastic sections in the form of grooves not having much non-woven fabric but the initial positioning of the bands of adhesive.

Upon leaving the activation unit 900, the laminate as a whole is wound on a cable drum 1000 onto a roller 1001 which may then be led directly to the training pants production units for application on training pants.

When the film is extruded and not yet laminated, stretching can be applied at a temperature in order to increase the line speed and reduce the grammage. The line speed can be in the range of 250 to 500 m/mn.

Besides, if one wishes to realise in the central section (in the sense of the longitudinal direction), between the two laterally arranged films, an additional section of plastic material, called the finger lift, a third extruder could be provided to form a third band of thermoplastic film. This finger lift band is not necessarily made of an elastic material. It can in particular be made of polypropylene. Its function is to allow the facial opening of the flap of the self-gripping system and to make it rigid.

In order to determine the remanence, or SET, the following method is used:

The sample is conditioned in a normal atmosphere such as that defined in the ASTDM 5170 norm, temperature of 23° C.+/−2° C. and relative humidity of 50%+/−5%.

By way of apparatus a dynanometer is used in accordance with the EN 10002 norm, in particular the Synergie 200H, 1 column, available from MTS Systems Corp, USA, together with TESTWORKS 4.04 B utilisation software.

The sample is prepared by cutting the elastic product (for example the laminate of the invention) with a cutter or scissors into a sample with a width of 45 mm in the machine direction (MD) (perpendicularly to the plan view of FIG. 1) and a length in the cross direction (CD) (transverse direction, horizontal direction in FIG. 1) of 60 mm. (Anti-slip) reinforcements, for example a layer of non-woven fabric in order to avoid slipping and the break leader of the sample, are positioned between the jaws, fixing them with a double face on either side of the elastic zone to be tested and on each side, as shown schematically in FIG. 3:

The parameters are selected as follows:
Inter-jaw distance: 20 mm
Machine speed: 254 mm/mn
Number of cycles: 2
Elongation of the product: 100% at constant speed.

The product is stretched at 100% through vertical movement of the upper jaw, whereby the lower jaw is fixed, the product is then held in the position for 30 seconds, then there is a return to the initial position at a constant speed where it is left for 60 seconds (end of the first cycle), then it is stretched again at 100%, it is held for 30 seconds and then there is a return to the initial position (end of the second cycle). The curve giving the stretching force as a function of the elongation in % is thus obtained, whereby this shows a hysteresis which allows the determination of the Set through the following calculation formula:

$$SET = L1 - L0$$

With:
L0: Intersection point with the axis of the X (elongation in %) at the start of the test, namely the start of the first cycle.
L1: Intersection point with the axis of the X (elongation in %) at the start of the second cycle after the return to the original position and the wait of 60 seconds.

A non-woven fabric is a textile surface obtained through mechanical and/or chemical and/or thermal bonding of textile fibres arranged in batts, excluding weaving or knitting (cf"Lexique des fils et des étoffes", ISBN: 2-9509924-1-2).

Thus, a non-woven fabric is a cluster of fibres of small dimensions which are associated with each other through mechanical compacting, through mixing with a bonding material or through partial fusion of the non-woven fabric. When the non-woven fabric is stretched according to the invention in order to activate it the small compacted fibres are separated from each other in order to break them away from each other. This de-cohesion causes the non-woven fabric to break. The fibres are not necessarily stretched and besides, in general, taking into account their size, are indeed not stretched. If one wishes to stretch them a so-called "increment" activation system can possibly be used. However, this system necessitates a complex installation with toothed rollers which engage in each other and according to the invention this can be omitted.

An elastic film is understood according to the invention to be a film which has, according to the preceding test, a remanence or SET which is less than 15%, preferably less than 10%, more preferably less than 5% for stretching of 100% of its initial width, and which, after having been stretched to 100% of its initial width comes back into a shape substantially identical to the shape it had before the stretching, and which in particular does not comprise corrugation, nor zones with bigger thickness than other zones, and in particular has an outer surface which is substantially smooth, that is to say does not comprise asperities of height extension more than the order of the micron, in particular does not have asperities of height dimension higher than 5 microns. In particular the elastic film is not microtextured.

An elastic material is understood to be a material such as a film constituted solely by this material which is elastic. Elasticity is the physical property of a body to resume its initial shape after suppression of the stress.

"Direct interposition of the fixing agent" is understood to mean according to the invention that said fixating agent is in direct contact on one hand with the elastic film. Preferably, it is also in direct contact with the non woven sheet or layer.

What is claimed is:

1. A laminate comprising at least one elastic film and at least one layer of non-woven fabric fixed to said film through direct interposition of an adhesive fixing agent, said at least one layer of non-woven fabric having an outer surface, wherein said outer surface is corrugated and includes ridge zones and hollow zones when the laminate is in a stretched state, the outer surface of said ridge zones being spaced from said film by a distance greater than the outer surface of said hollow zones so that said outer surface of said ridge zones includes at least one farthest point which is farthest away from said film and said outer surface of said hollow zones includes at least one closest point which is closest to said film, both said farthest point and said closest point measured in a direction perpendicular to said film, and wherein an imaginary straight line extending from said at least one farthest point perpendicular to said film passes through said fixing agent and wherein an imaginary straight line extending from said at least one closest point perpendicular to said film does not pass through said fixing agent.

2. The laminate according to claim 1, wherein said outer surface is substantially planar when the laminate is in a non-stretched state.

3. The laminate according to claim 1, wherein said at least one sheet of non-woven fabric, has a remanence of less than 15% after an elongation of 100% of the initial width.

4. The laminate according to claim 1, wherein said ridge zones are of a constant thickness.

5. The laminate according to claim 1, wherein said fixing agent includes a layer of material on the surface of said non-woven fabric facing said elastic film which has been melted by soldering.

6. The laminate according to claim 1, wherein said fixing agent interposed between said at least one sheet of non-woven fabric and said elastic film is an adhesive having a grammage of less than 12 g/m2.

7. The laminate according to claim 1, wherein said at least one non-woven fabric includes fibers, and said fibers are not submerged even partially in the material of said at least one elastic film.

8. The laminate according to claim 1, wherein a reinforcement strip is positioned parallel to said elastic film, making a zone of the non-woven fabric rigid, said reinforcement strip being a band of thermoplastic film formed adjacent to said elastic film.

9. The laminate according to claim 1, wherein said layer of non-woven fabric includes an outer surface that forms at least a portion of said corrugated surface and a generally planar inner surface facing said film, and wherein said adhesive fixing agent is in contact with said film and said generally planar inner surface of said layer of non-woven fabric.

10. A laminate comprising at least one elastic film having a width and at least one layer of non-woven fabric fixed to said film at least on said width through direct interposition of an adhesive fixing agent, said at least one layer of non-woven fabric having an outer surface which is corrugated when the laminate is in a stretched state, said corrugated surface having ridge zones and hollow zones, the outer surface of said ridge zones being spaced from said film by a distance greater than the outer surface of said hollow zones so that said outer surface of said ridge zones includes at least one farthest point which is farthest away from said film and said outer surface of said hollow zones includes at least one closest point which is closest to said film, both said farthest point and said closest point measured in a direction perpendicular to said film, wherein said adhesive fixing agent is provided in the form of bands separated from each other by intermediate zones without adhesive, and wherein an imaginary straight line extending from said at least one farthest point perpendicular to said film passes through said fixing agent and wherein an imaginary straight line extending from said at least one closest point perpendicular to said film passes through said intermediate zone.

11. The laminate according to claim 10, said bands of adhesive fixing agent being jointive.

12. The laminate according to claim 10, wherein said outer surface is substantially planar when the laminate is in a non-stretched state.

13. The laminate according to claim 10, wherein said at least one sheet of non-woven fabric, has a remanence of less than 15% after an elongation of 100% of the initial width.

14. The laminate according to claim 10, wherein said ridge zones are of a constant thickness.

15. The laminate according to claim 10, wherein said fixing agent includes a layer of material on the surface of said non-woven fabric facing said elastic film which has been melted by soldering.

16. The laminate according to claim 10, wherein said fixing agent interposed between said at least one sheet of non-woven fabric and said elastic film is an adhesive having a grammage of less than 12 g/m2.

17. The laminate according to claim 10, wherein said at least one non-woven fabric includes fibers, and said fibers are not submerged even partially in the material of said at least one elastic film.

18. The laminate according to claim 10, wherein said at least one elastic film has, on a side adjacent said at least one sheet, a generally planar surface and wherein all the fibers of the at least one sheet of non-woven fabric are on the same side of said planar surface.

19. The laminate according to claim 10, wherein a reinforcement band of thermoplastic film is formed adjacent to said elastic film.

20. A laminate comprising at least one elastic film and at least one layer of non-woven fabric fixed to said film through direct interposition of an adhesive fixing agent, said at least one layer of non-woven fabric having an outer surface which is spaced from said film, said outer surface of said at least one layer of non-woven fabric being corrugated when the laminate is in a stretched state, said corrugated surface having alternating ridge zones and hollow zones, the outer surface of said ridge zones being at a distance from said film greater than the distance from the outer surface of said hollow zones to said film so that said outer surface of said ridge zones includes at least one farthest point which is farthest away from said film and said outer surface of said hollow zones includes at least one closest point which is closest to said film, both said farthest point and said closest point measured in a direction perpendicular to said film, wherein said adhesive fixing agent is provided in the form of bands separated from each other by intermediate zones without adhesive, and wherein an imaginary straight line extending from said at least one farthest point perpendicular to said film passes through said fixing agent and wherein an imaginary straight line extending from said at least one closest point perpendicular to said film passes through said intermediate zone, wherein each said ridge zone mates with a single band of adhesive and each said band of adhesive mates with a single ridge zone.

* * * * *